(No Model,)
C. F. MOSMAN.
COFFIN HANDLE.
No. 524,786. Patented Aug. 21, 1894.
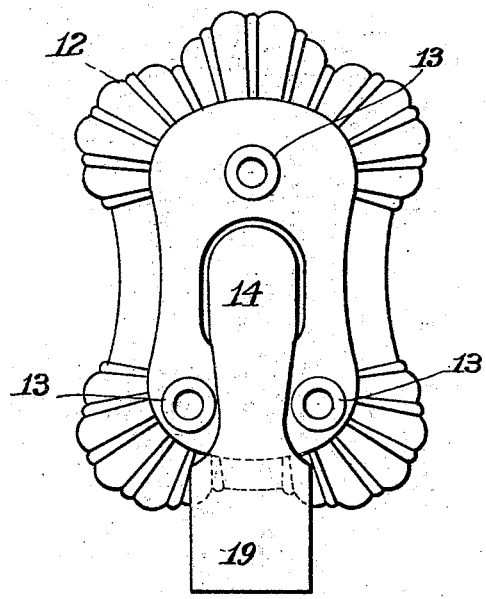
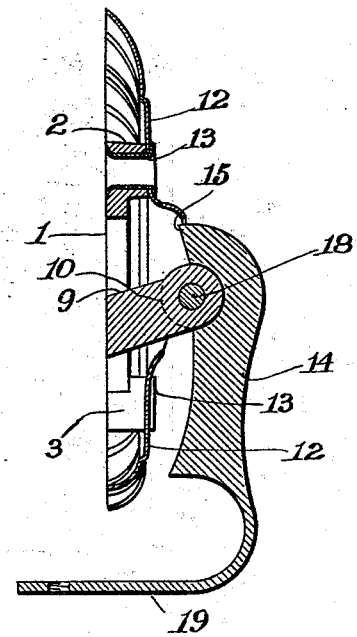
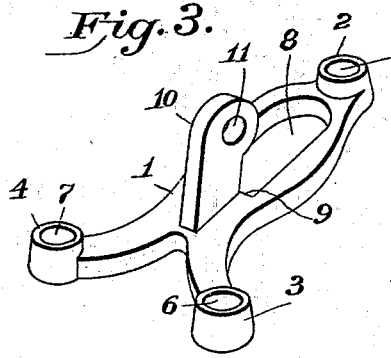
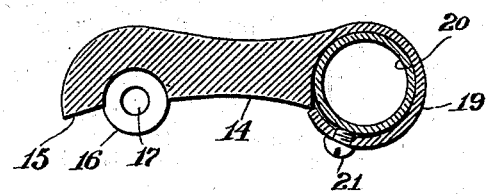
WITNESSES:
J. F. Finch.
M. T. Longden.
INVENTOR
C. F. Mosman
BY
T. Smith Jr.
ATTORNEY
THE NORRIS PETERS CO., PHOTO-LITHO., WASHINGTON, D. C.

UNITED STATES PATENT OFFICE.

CHARLES F. MOSMAN, OF BRIDGEPORT, CONNECTICUT, ASSIGNOR OF ONE-HALF TO ANDREW KROUSE, OF SAME PLACE.

COFFIN-HANDLE.

SPECIFICATION forming part of Letters Patent No. 524,786, dated August 21, 1894.

Application filed July 2, 1894. Serial No. 516,375. (No model.)

*To all whom it may concern:*

Be it known that I, CHARLES F. MOSMAN, a citizen of the United States, residing at Bridgeport, in the county of Fairfield and State of Connecticut, have invented certain new and useful Improvements in Handle Attachments for Coffins and the Like; and I do hereby declare the following to be a full, clear, and exact description of the invention, such as will enable others skilled in the art to which it appertains to make and use the same.

My invention relates to certain new and useful improvements in handle attachments for coffins and the like, and has for its object to produce a simple and economical device of this description, and at the same time to permit of considerable variety in the general appearance of the device without in any way impairing the strength of the latter.

In the accompanying drawings Figure 1 is a front elevation of my improvement; Fig. 2 a central vertical sectional elevation of the same; Fig. 3 a detail perspective of the bracket, and Fig. 4 a detail sectional elevation of the drop bar and showing the handle bar secured therein.

Similar numbers of reference denote like parts in the several figures of the drawings.

1 is the bracket having at its extremities three hubs 2, 3, 4, which are disposed in the general shape of a triangle, which hubs are all perforated as seen at 5, 6, 7, respectively.

8 is an opening within the bracket and 9 a shoulder which constitutes the lower wall of said opening. 10 is a stud projecting from the body of the bracket and perforated as seen at 11.

12 is the escutcheon plate which is secured to the bracket by means of eyelets 13 passed through said plate into the perforations 5, 6, 7.

14 is the drop bar which has formed therewith immediately in the rear of its nose 15 ears 16 (only one being shown) perforated as seen at 17, this bar being pivoted to the stud 10 by means of a pintle 18 passed through the perforated ears and the perforation 11 in the stud. The lower end of the drop bar is formed with an extended tail 19 as shown at Fig. 2 which latter is curled around the handle bar 20 and secured thereto by a set screw 21 as shown at Fig. 4.

The attachment as heretofore described is secured to the body of a coffin by means of screws passed through the eyelets 13. The drop bar may be formed with a ring at the bottom through which the handle bar may be inserted, but I prefer to secure the handle bar in the manner shown and described for the reason that the latter is generally finished in silver which latter would be marked and defaced if the handle bar were driven through permanent rings.

It will be readily understood from the foregoing description that, owing to the fact that the bracket is separate from the escutcheon plate a great variety of effects in the general appearance may be obtained by using different escutcheon plates in connection with the bracket, and this will of course greatly lessen the cost of the complete device in that the escutcheon plates may be struck up in dies separate from the bracket and may be used in connection with the latter according to the demands of the occasion.

The eyeletting of the bracket and escutcheon plate together renders these capable of use with great facility, and moreover such assembly of these parts need not be made until the handle attachment is required for use.

When the device is in use and the handle bar raised the nose 15 of the drop bar will abut against the shoulder 9 on the bracket thereby sustaining the handle bar in a horizontal position during use.

Having thus described my invention, what I claim as new, and desire to secure by Letters Patent, is—

1. In a handle attachment for coffins and the like, the combination of the bracket having perforated hubs and a shoulder and provided with a perforated stud, the escutcheon plate secured to said hubs by eyelets, the drop bar pivoted to said stud and having a nose adapted to abut against said shoulder when said bar is elevated to a horizontal position, and the handle bar secured within the lower end of said drop bar, substantially as set forth.

2. In a handle attachment for coffins and the like, the combination of the bracket having perforated hubs and provided with a perforated stud, the escutcheon plate formed separate from said bracket but secured to said hubs by eyelets, and the drop bar pivoted to said stud, substantially as set forth.

In testimony whereof I affix my signature in presence of two witnesses.

CHARLES F. MOSMAN.

Witnesses:
F. W. SMITH, Jr.,
M. T. LONGDEN.